Feb. 25, 1964  W. R. LAWSON, SR  3,122,241
AUTOMATIC PACKAGING MACHINE
Filed Dec. 21, 1960  7 Sheets-Sheet 1

INVENTOR
WILLIE R. LAWSON, SR
BY
ATTORNEYS

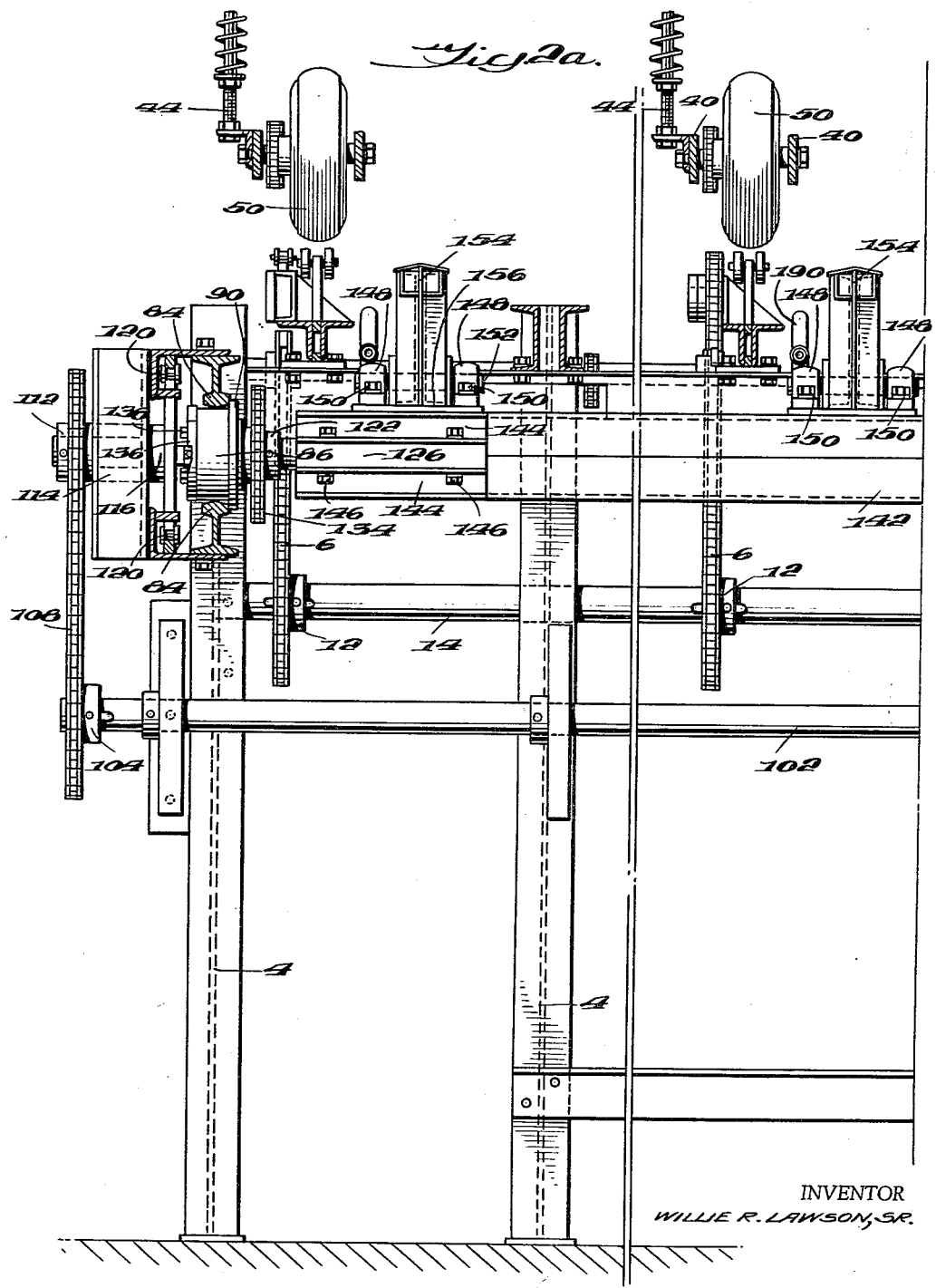

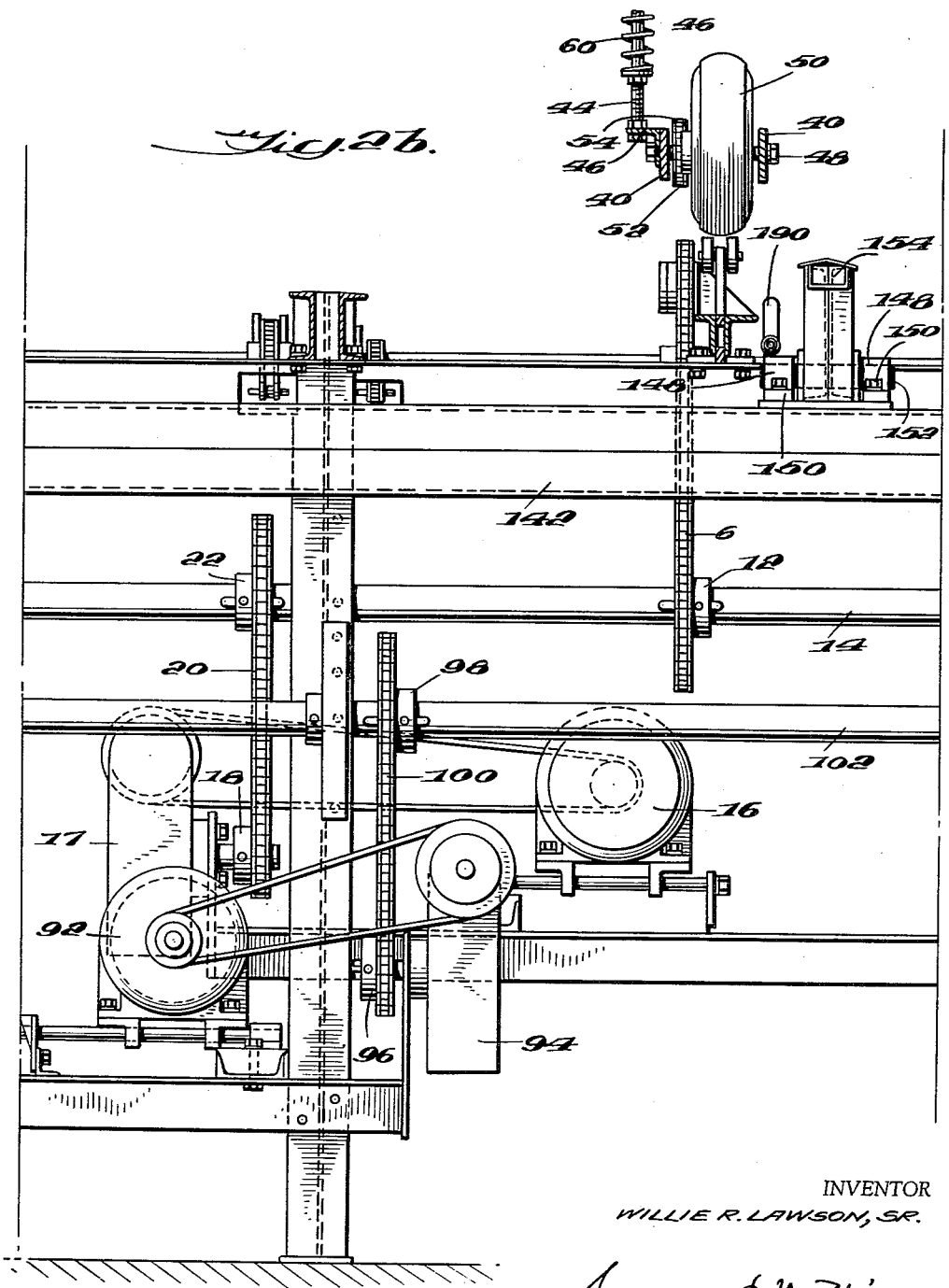

Feb. 25, 1964
W. R. LAWSON, SR
3,122,241
AUTOMATIC PACKAGING MACHINE
Filed Dec. 21, 1960
7 Sheets-Sheet 4
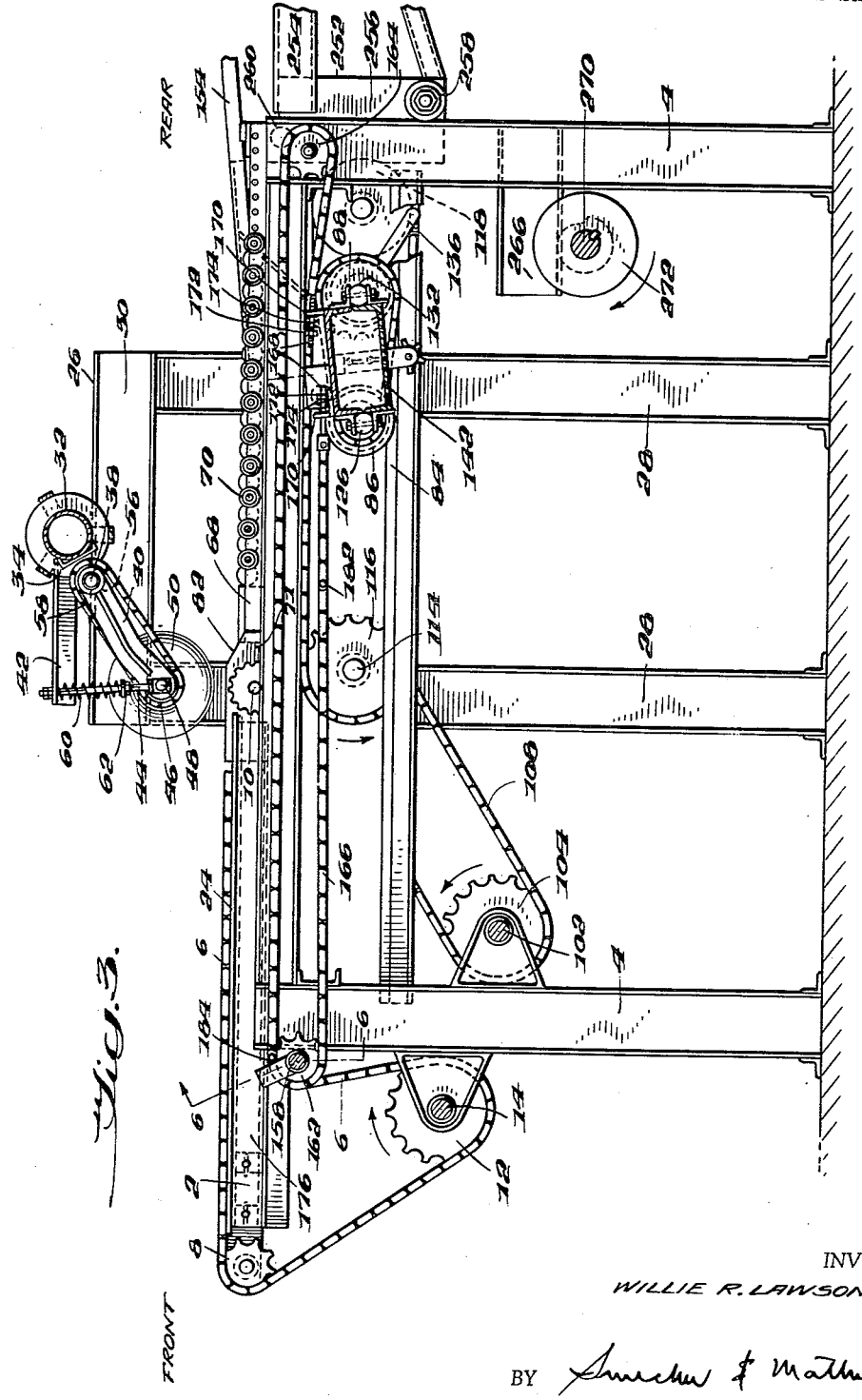
INVENTOR
WILLIE R. LAWSON, SR.
BY *Smecker & Mathis*
ATTORNEYS

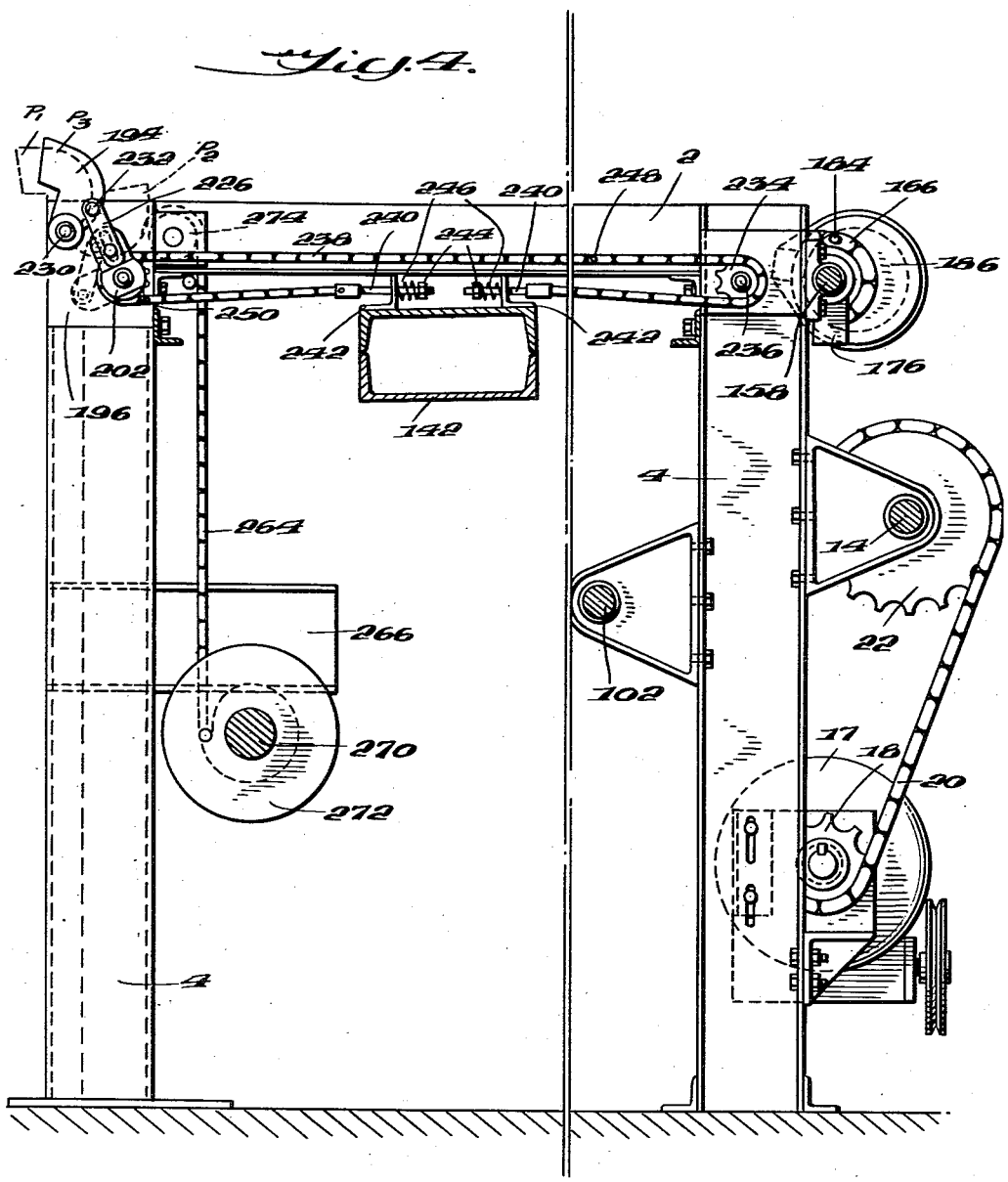

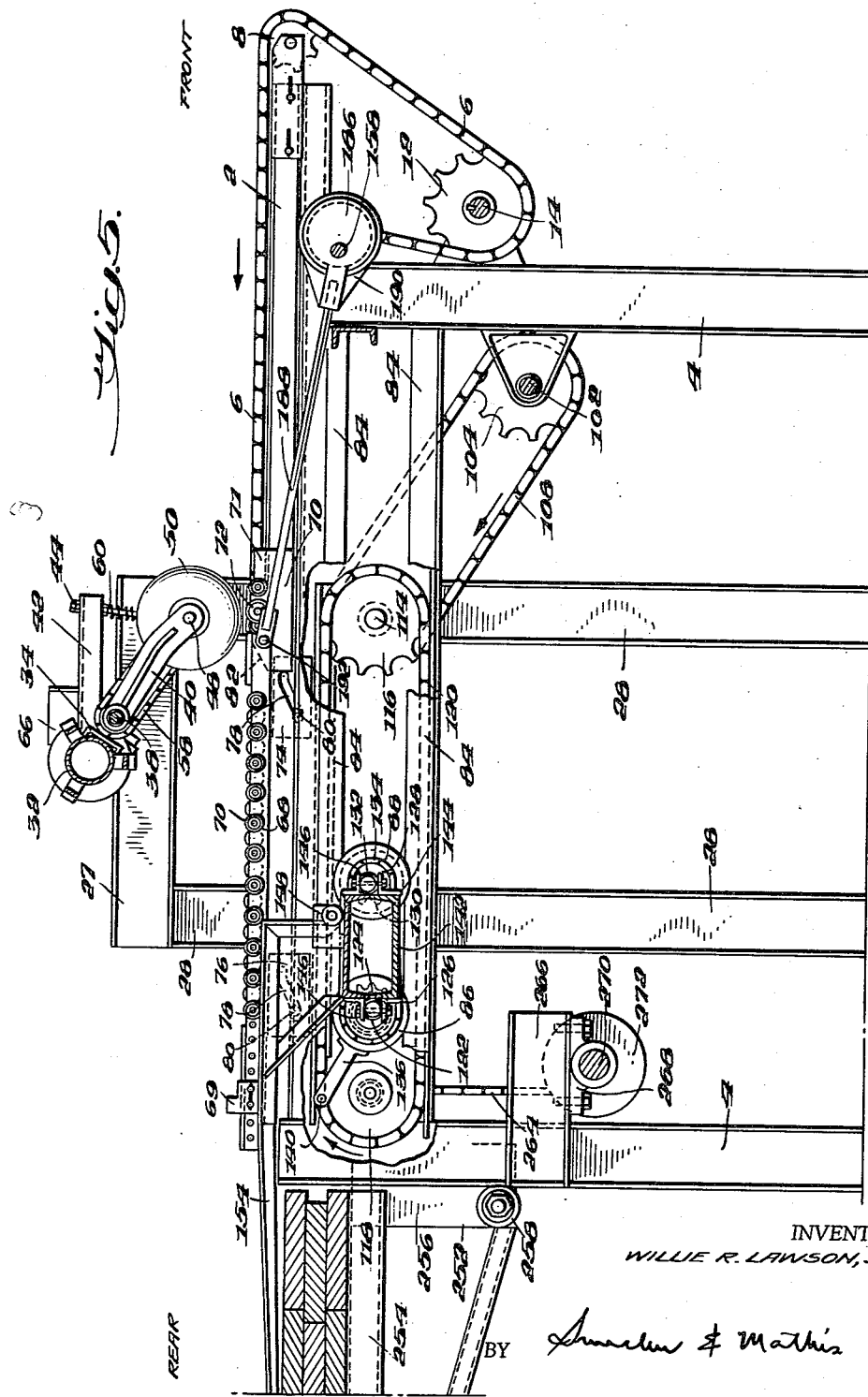

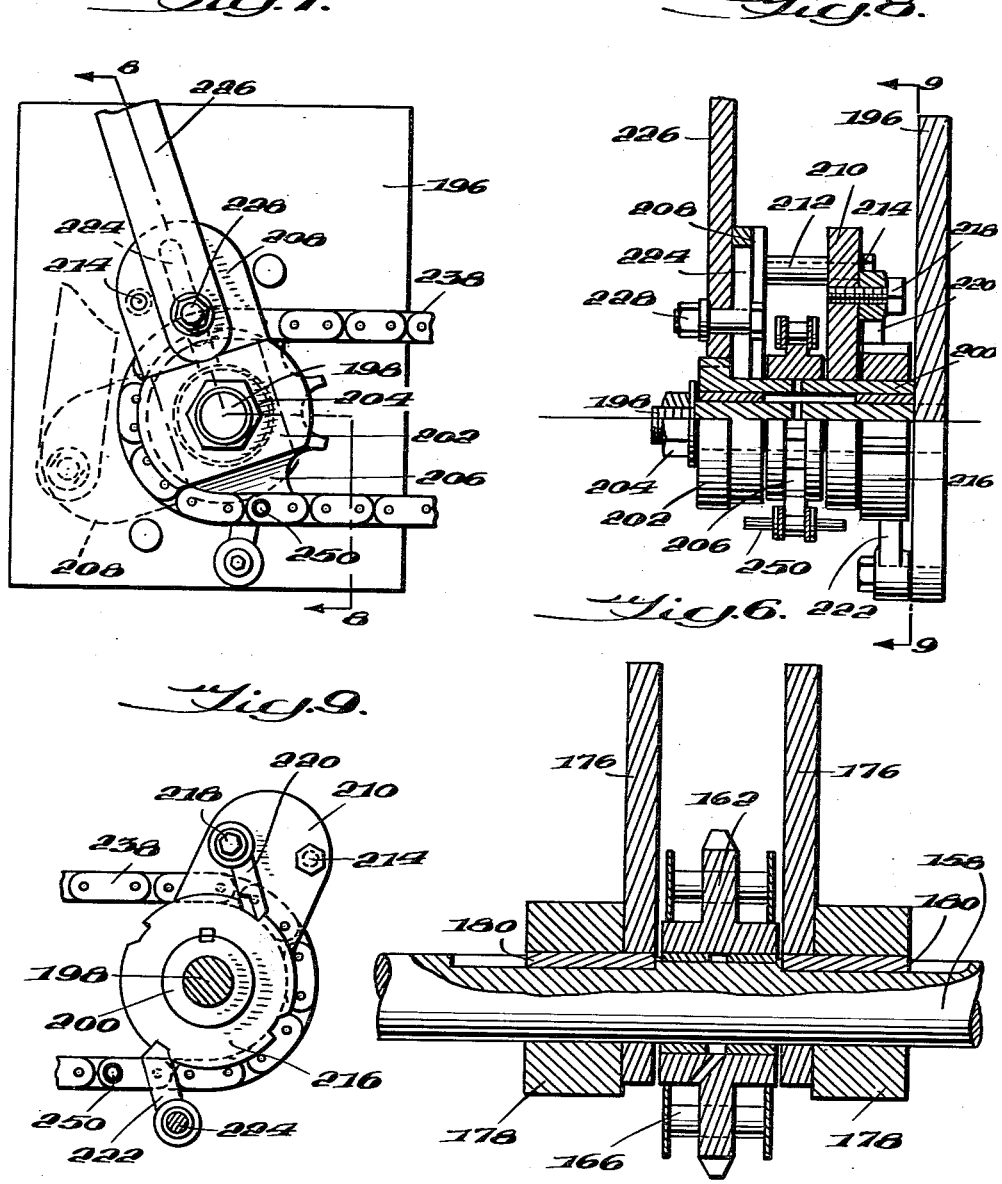

3,122,241
AUTOMATIC PACKAGING MACHINE
Willie R. Lawson, Sr., % Walters Mfg. Co., P.O. Box 498, Morristown, Tenn.
Filed Dec. 21, 1960, Ser. No. 77,312
8 Claims. (Cl. 214—6)

This invention relates to an automatic packaging machine, and more particularly, to a machine for stacking cut lumber in bundles.

It is customary practice to stack lumber after it has been cut. Several stacks of lumber may be bound together by metal strapping into a bundle, to facilitate handling of the cut lumber. When boards of equal width are stacked directly on top of each other, and several stacks are placed edge to edge next to each other, the stacks of boards tend to separate, making it difficult to transport the stacks as a bundle, without tying the stacks together with strapping. One method of tying the stacks together without the use of strapping is to stagger the courses so that the edges are misaligned. Stacking by this method, heretofore, has been done manually and, therefore, is expensive and slow.

It is an object of this invention to provide a machine which will stack cut lumber in bundles.

Another object of this invention is to provide a machine which will automatically stack lumber in bundles.

A further object of this invention is to provide a machine which will automatically stack lumber in bundles with staggered courses.

These objects may be accomplished, according to a preferred embodiment of the invention, by a machine with a wide frame. An accumulating conveyor receives the cut lumber from the sawmill conveyor in edge to edge alignment. The desired number of boards to form one course of a bundle are transported from the accumulating conveyor to a rack. The boards are picked up in courses from the rack by arms and deposited on a hoist. The cycle is repeated automatically until the desired number of courses to form a bundle have been deposited. Each course is staggered from the preceding course by means of dogs which position the edge of each course as it is being transferred from the arms to the hoist so that each layer is staggered from the preceding layer.

This preferred embodiment of the invention is illustrated in the accompanying drawings, in which:

FIGS. 2a and 2b are a cross-sectional view of the machine along line 2—2 in FIG. 1.

Fig. 3 is a longitudinal section along line 3—3 in FIG. 1.

FIG. 4 is a longitudinal section along line 4—4 in FIG. 1.

FIG. 5 is a longitudinal section along line 5—5 in FIG. 1.

FIG. 6 is a cross-sectional view of the sprocket assembly along line 6—6 in FIG. 3.

FIG. 7 is a detail view of the dog operating mechanism.

FIG. 8 is a cross-sectional view along line 8—8 in FIG. 7.

FIG. 9 is a longitudinal section along line 9—9 in FIG. 8.

Figure 1:
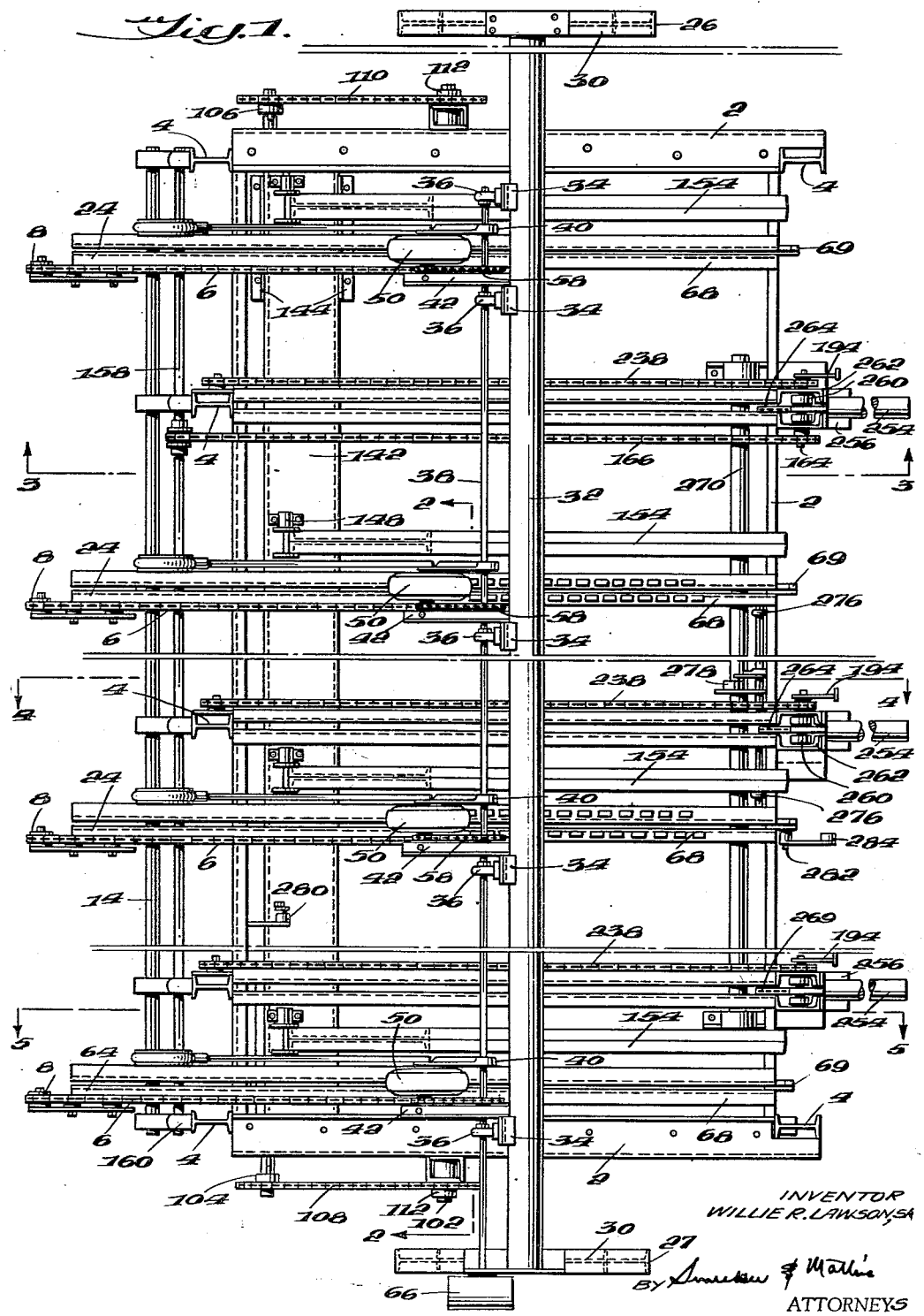
FIG. 1 is a top plan view of the packaging machine.

The invention is shown mounted on a frame 2 which is supported by legs 4. A series of parallel chains 6 are mounted on sprockets 8, 10, 12 at the front of the frame 2. Sprockets 12 are keyed to a shaft 14. As shown in FIGS. 2b and 4, shaft 14 is driven by a motor 16 through a reduction gear unit 17, a sprocket gear 18, a power chain 20 and a sprocket gear 22.

As shown in FIGS. 1 and 3, a plurality of chains 6 are supported on top of the frame by guide plates 24. The guide plates are rigidly affixed to the frame 2. All of the guide plates are the same height above the frame, so that a board can be supported equally by each chain when it is placed transversely across the chains.

Supporting pillars 26 and 27 are provided at opposite ends of the frame 2 and, as shown in FIG. 1, are spaced from the ends of the frame 2. The pillars comprise posts 28, secured together at the top by cross bars 30. Secured to the cross bars 30 and suspended between the pillars 26 and 27 is a beam 32. Mounting plates 34 are provided on the beam 32 at suitable intervals. Secured to the mounting plates 34 are bearing members 36. A shaft 38 is journaled in the bearing members 36 to rotate with respect thereto.

Adjacent the bearing members 36, a pair of struts 40 are journaled on shaft 38, so that the shaft may rotate relative thereto. Brackets 42 are affixed to each mounting plate 34 and suspended from the brackets 42 are bolts 44. Secured to the end of one of the struts 40 is an angle bracket 46, as shown in FIGS. 2b and 3. The end of the bolt 44 extends through a hole in the angle bracket 46 and is secured thereto by a pair of nuts. An axle 48 is mounted between the ends of the pair of struts 40. A wheel 50 is mounted for rotation on the axle 48. A spring 60 is mounted coaxially on each bolt 44. The springs 60 are compressed between nuts 62 and brackets 42. The compression of the spring is adjusted by threading the nut 62 upward or downward on bolt 44. The bolt 44 permits the wheel to move upward or downward, but the spring 60 urges the wheel downward.

Each wheel 50 is provided with a hub 52 to which is secured a sprocket gear 54. In alignment with the gears 54 are sprocket gears 56 keyed to shaft 38. Gear 54 is driven by gear 56 by means of a drive chain 58, so that rotation of shaft 38 causes rotation of each wheel 50 in a counter-clockwise direction when viewed as in FIG. 3. Thus, rotation of the wheels 50 will feed the lumber from the chains 6 toward the rear of the frame 2. The shaft 38 is driven by a motor 66 through a gear reduction unit, as shown in FIGS. 1 and 5.

Substantially in alignment with chains 6 are racks 68. Each of the racks 68 is provided with a series of rollers 70 which are rotatably mounted on the racks 68. A stop 69 is attached to the rearward end of each rack. Beneath the wheels 50 and between the chains 6 and racks 68, roller plates 71 are secured to the frame 2. A series of rollers 72 is rotatably mounted on the roller plates 71. The tops of rollers 72 are substantially in alignment with the top of the chain 6 (FIG. 5).

Referring to FIG. 5, racks 68 are provided with guide plates 74 and 76 affixed to the bottom of each rack. Each guide plate has a slot 78. A pin 80 is affixed to the frame 2 and extends through each slot 78. Due to the shape of the slot, when the rack 68 is moved rearward (to the left in FIG. 5), it will move horizontally for a short distance and then as the pin 80 enters the sloping portion of the slot the rack 68 will move downward into the frame 2. As the pin 80 reaches the end of the slot 78 the rack will move horizontally. Similarly, when the rack 68 is moved from the rearward position forwardly, it will move upwardly out of the frame. The rearward position of the rack 68 is shown in FIG. 3.

When the rack 68 is in the forward position (toward the right in FIG. 5), its forward end will be supported by the roller plate 71 adjacent the rollers 72. The rear edge of the roller plate 71 has an inclined portion 82, of the same slope as that of the slots 78. When the rack 68 is moved rearward, as described above, the forward end of the rack will slide down the inclined portion 82. When the rack 68 is moved forward again, it will slide up the inclined portion 82.

Referring to FIGS. 2a and 5, parallel guide rails 84 are affixed to both ends of the frame 2. Rollers 86 and 88 are mounted to slide longitudinally between the guide rails 84. Each roller has an inboard flange 90 to insure its remaining on the guide rails.

A motor 92, as shown in FIG. 2b, drives a gear reduction unit 94. Sprocket gears 96 and 98 and power chain 100 transmit rotational motion from the gear reduction unit 94 to shaft 102. Sprocket gears 104 and 106 are keyed to opposite ends of the shaft 102. Power chains 108 and 110 drive sprocket gears 112. Both sprocket gears 112 are keyed to shaft 114 which is journaled in frame 2. Sprocket gears 116 are keyed to the opposite ends of shaft 114, adjacent the guide rails 84. A sprocket gear 118 is journaled on the frame 2 in alignment with gear 116. A power chain 120 connects sprocket gears 116 and 118.

Referring to FIGS. 2a and 5, the rear roller 86 has a hub 122 and affixed to the hub is a sprocket gear 124. A tube 126 is rotatably mounted on the end of the hub 122. The tube is offset from the central axis of roller 86, so that as the roller turns, the tube will be raised and lowered with respect to the guide rails 84. Front roller 88 similarly has a hub 128, a sprocket gear 130, and a tube 132 which is offset from the central axis of the roller 88. A roller chain 134 connects the sprocket gears 124 and 130 so that rotation of roller 86 will cause a corresponding rotation of roller 88. Tubes 126 and 132, however, are located on opposite sides of the centers of rollers 86 and 88 so that movement of the chain 134 will cause one tube to be raised and the other to be lowered. A lever 136 is affixed to roller 86 by screws 138. The end of the lever 136 is pivotally attached to roller chain 120 by a rivet 140. Pivotal movement of the lever 136 causes rotation of roller 86 and the consequent rotation of roller 88, since roller chain 134 transmits rotational movement to roller 88.

Extending across the width of the frame is a girder 142. Each end of the girder 142 has angle plates 144 affixed at the sides thereof, the sides of the angle plates being of sufficient separation to engage the tubes 126 and 132 between them. Bolts 146 extend through the angle plates 144 and tubes 126 and 132 preventing rotation of the tubes with respect to the girder 142. The girder 142 also maintains the separation between rollers 86 and 88.

Bearing brackets 148 are spaced along the length of the girder 142. The brackets are secured to the girder by means of bolts 150. Rotatably mounted between each pair of brackets 148 is a shaft 152. Fork arms 154 are pivotally mounted on each shaft 152. The lower edge portion 156 of the fork arms 154 rests on the top of the girder 142.

As chain 120 rotates in a clockwise direction, as shown in FIG. 5, lever 136 causes rollers 86 and 88, and girder 142 to move to the right. In the extreme right end position pin 140 moves around sprocket 116. This movement is transmitted to roller 86, which is rotated counterclockwise. Chain 134 transmits this rotation to roller 88, which is rotated counterclockwise also. Due to the eccentric location of tubes 126 and 132, tube 126 will be moved upward and tube 132 will be moved downward. This causes girder 142 to be rotated clockwise to the position shown in FIG. 3. When the girder 142 is thus oriented, fork arms 154, which are supported by the girder, will be inclined upward. Similarly, when pin 140 moves back to the position shown in FIG. 5, the girder 142 will rotate from the position shown in FIG. 3 to that shown in FIG. 5. This will cause the fork arms 154 to move downward.

As previously described, rack 68 is movable upward and downward along inclined portion 82 and slots 78. This movement is synchronized with the movement of girder 142. A shaft 158 is journaled in brackets 160 at the front of the frame 2. A sprocket gear 162 is rotatably mounted on shaft 158. At the rear of the frame 2, a sprocket gear 164 is rotatably mounted in alignment with gear 162. A roller chain 166 is carried by sprocket gears 162 and 164. Adjusting bolts 168 are secured to each end of chain 166. Brackets 170 are affixed to girder 142. Bolts 168 extend through holes in brackets 170 and tension is applied to the chain 166 by adjusting nuts 172 which compress springs 174 between the nuts 172 and brackets 170.

Referring to FIG. 6, sprocket gear 162 is mounted on shaft 158 and rotatable relative to the shaft. A pair of levers 176 are keyed to the shaft 158 at each side of gear 162. Spacers 178 are keyed to the shaft adjacent the levers 176 and a key 180 engages both the spacers and levers. The spacers are secured against axial movement by means of set screws, not shown. Extending outwardly from chain 166 are two pins 182 and 184. When rollers 86 and 88 are in the rearward position, as shown in FIG. 3, pin 184 engages lever 176 and rotates it counter-clockwise. When the rollers move to the forward position chain 166 moves correspondingly and pin 182 rotates the lever 176 clockwise. Since levers 176 are keyed to shaft 158, rotation of the levers causes the shaft to rotate.

Spaced along the length of shaft 158 are positive return cams 186. One end of a rod 188 is affixed to the cam follower 190 and the opposite end of the rod is pivotally attached to the rack 68 by means of screw 192. As the shaft 158 rotates, cam 186, which is keyed to the shaft, rotates and the cam follower 190 causes the rod 188 to reciprocate longitudinally. The reciprocating movement of the rod 188 causes the rack 68 to move upward and downward on the inclined portion 82 and slots 78.

Staggering of each course of boards is accomplished by dogs 194, whose movement is controlled by the girder 142. Referring to FIGS. 4, 7, 8 and 9, a plate 196 is affixed to each leg 4 at the rear of the frame 2. A stub shaft 198 extends outward from the plate 196. A tube 200 is mounted coaxially on the shaft 198 and is rotatable relative to the shaft. The outward end of the tube is flanged in the form of an eccentric 202. A nut 204 on shaft 198 prevents axial movement of the tube 200. Rotatably mounted on the tube 200 is a sprocket gear 206. Mounted adjacent the gear 206 are levers 208 and 210. The levers 208 and 210 are rotatable relative to the shaft 200 and sprocket gear 206. The levers are secured together by a spacer 212 and a bolt 214.

A ratchet wheel 216 is mounted on tube 200 between lever 210 and plate 196. The wheel 216 is secured to the tube 200 by a key, so that rotation of wheel 216 causes a corresponding rotation of eccentric 202. Attached to lever 210 by a screw 218 is a pawl 220 in position to engage the transverse grooves of the ratchet wheel 216. A secondary pawl 222 is attached to plate 196 by a screw 224 in position to engage the ratchet wheel 216. Both pawls 220 and 222 are yieldably urged against the ratchet wheel by springs (not shown).

Lever 208 is provided with a longitudinal slot 224. A link 226, having a hole in one end is pivotally attached to the lever 208 by a bolt 228 extending through the slot in the lever 208 and the hole in link 226. Dog 194 is pivotally attached to plate 196 by a pin 230, as shown in FIG. 4. The dog 194 may be pivoted from the position designated $P_1$ to the position $P_2$. The end of link 226 is pivotally attached to dog 194 by a screw 232. The opposite end of link 226 abuts against eccentric 202.

A sprocket gear 234 is rotatably mounted on a stub shaft 236, which is affixed to leg 4 at the front of the frame 2. Sprocket gear 234 is in alignment with gear 206 and a roller chain 238 operatively connects the gears. Adjusting bolts 240 are affixed to girder 142 and the bolts 240 extend through holes in brackets 242. Tension is applied to the chain 238 by adjusting nuts 244 which compress springs 246 between the nuts 244 and brackets 242.

The roller chain 238 is provided with two pins 248 and 250 which extend outwardly from the chain. When girder 142 moves to the rearward position, pin 250, which is part of chain 236, moves between the eccentric 202 and ratchet wheel 216, as shown in FIG. 8. Pin 250 contacts levers 208 and 210 and swings them to the position shown in full lines in FIG. 7. When girder 142 moves to the forward position, pin 248 moves rearward with chain 238 and swings levers 208 and 210 to the position shown in dotted lines in FIG. 7.

Referring to FIG. 9, when lever 210 is moved clockwise by pin 248, pawl 220 causes ratchet wheel 216 to rotate 90°. Since wheel 216 and eccentric 202 are secured together by tube 200, the eccentric will rotate 90° also. Levers 208 and 210, wheel 216 and eccentric 202 will all rotate together clockwise through 90°. Opposite movement of chain 238 will cause pin 250 to rotate lever 210 counter-clockwise upward. Pawl 222, however, prevents counter-clockwise rotation of wheel 216 and, accordingly, lever 208 will rotate 90° relative to eccentric 202.

The ratchet wheel and eccentric impart a three position movement to the dog 194. The dog will lie in position $P_2$ when girder 142 is in the forward position and during its travel rearward until pin 250 causes levers 208 and 210 to rotate upward. Lever 208, through link 226 will pivot dog 194 to position $P_3$ since the end of line 226 abuts against the low side of eccentric 202. Dog 194 will remain in this position until girder 142 moves to the forward position and pin 248 pivots lever 208 downward. Due to the connection of dog 194 to lever 208 through link 226, dog 194 will pivot from position $P_3$ to $P_2$. When the girder 142 again moves rearward, pin 250 pivots lever 208 upward, but since pawl 222 prevents rotation of wheel 216, eccentric 202 will not rotate. Thus, the end of link 226 will abut against the high side of eccentric 202 and the dog 194 will be pivoted to position $P_1$. Reciprocation of girder 142 causes dog 194 to alternate between positions $P_1$ and $P_3$ during each succeeding cycle of movement of the girder 142.

At the rear of the frame 2, a receiving hoist 252 is provided on which the lumber is stacked. Arms 254 extend outward from the rear of the frame. As shown in FIGS. 1, 3, and 5, each arm is affixed to a carriage 256. Each carriage is supported by guide wheels 260 which ride on guide rails 262 inside legs 4. Vertical movement of the carriage is controlled by a chain 264 which is affixed to the top of the carriage 256 adjacent guide wheels 260.

Mounting plates 266 as shown in FIGS. 4 and 5, are affixed to legs 4 beneath the rear of the frame 2. A bearing block 268 is secured to each mounting plate 266. Rotatably mounted in the bearing blocks 268 is a shaft 270, which, as shown in FIG. 1 extends across the width of the frame 2. Reels 272 are mounted on the shaft 270 and keyed against relative movement. The end of each chain 264 is secured to a reel 272 and extends over the pulley 274 mounted at the top of the leg 4. As previously stated, the opposite end of the chain 264 is secured to the carriage 256. Rotation of the shaft 270 causes the reels 272 to wind or unwind chains 264 imparting a corresponding upward or downward movement, respectively, of the receiving hoist 252.

Movement of various parts of the machine is controlled by limit switches. Referring to FIG. 1, pins 276 are mounted at the rear of frame 2 and project above racks 68. When a full course of boards is deposited on the racks 68, the edge of the outer board contacts pins 276, movement of which actuates switch 278. Switch 278 starts the motor 92 which operates the girder 142 and, at the same time, stops motor 66 which stops wheels 50 from feeding boards to racks 68. Another limit switch 280 is in position to contact the girder 142 when it is in the forward position. The switch 280 is actuated by the girder 142 as it returns to the forward position to stop motor 92. To control movement of the receiving hoist 252, a limit switch 282 is actuated by the downward movement of rack 68. When actuated, the switch 282 causes the hoist to descend until arm 284, which contacts the boards on the hoist, is moved downward the thickness of one board.

In operation, motors 16 and 66 are turned on. Motor 16 causes the roller chains 6 to be actuated and motor 66 causes wheels 50 to rotate. Boards are placed in edge-to-edge alignment transversely across the chains 6. The chains convey the boards to the wheels 50 which feed them to the racks 68. The boards are pushed over the rollers 70 by succeeding boards until the outer board rests against stops 69. When the boards contact the stops 69 they also engage the pins 276 (FIG. 1) which operate switch 278. Switch 278 turns off motor 66, which will cause the wheels 50 to stop. Thus, the movement of the boards from chains 6 to racks 68 is stopped when a course of boards have been deposited on the racks 68.

Switch 278 also starts motor 92. Operation of motor 92 causes the transverse girder 142 to move rearward. Lever 136, which is attached to the chain 120, causes the girder 142 to rotate clockwise thereby lifting the forkarms 154. As the ends of the forkarms rise above the level of the rollers 70, they will begin to lift the course of boards off of the racks 68. By means of the chain 166 attached to the girder 142, cam 186 will cause the racks 68 to move downward into the frame 2. This will deposit the course of boards on the fork arms 154 and allow the lumber to move rearward on the fork arms 154 without interference from the rollers 70 or the stops 69. As the racks 68 move downward and rearward, it actuates switch 282 which allows the receiving hoist 252 to descend the thickness of one board.

Movement of the girder 142 rearward causes the dogs 194 to move out of the frame to position $P_1$ or $P_3$, depending on whether link 226 abuts against the high side or low side respectively of the eccentric 202. Pin 250 is located at a point on the chain 238 which will cause the dogs 194 to be raised after the inner edge of the boards on the forkarms 154 have passed over the dogs 194. When the girder 142 reaches its rear-most position, lever 136 will swing upward and thereby impart a counter-clockwise rotation to the girder and consequently to the forkarms 154. The girder 142 will then move toward the forward position and the dogs 194 will engage the inner edge of the course of boards and hold them in place while the forkarms 154 move forward. In this matter, a course of boards is deposited on the receiving hoist 252. Since the dogs 194 will be positioned at $P_1$ and $P_3$ in successive cycles, the edges of alternate courses of boards will be in alignment and adjacent courses will be offset from each other.

During the forward movement of the girder 142, cam 186 will move the rack 68 upward and out of the frame 2 and cam 248 will cause the dogs 194 to be pivoted downward into the frame 2. When the girder 142 reaches the forward position, it will engage the limit switch 280 which will cause the motor 92 to stop. The girder 142 will remain in the forward position until another course of lumber has been deposited on the racks 68. Pins 182 and 184 are located at points on chain 166 which will cause the racks 68 to be raised as the girder 142 approaches the front of the frame 2 and, since no boards engage the pins 276, the motor 66 and wheels 50 will be started. The cycle will then be repeated automatically.

While the invention has been illustrated and described in one embodiment, it is recognized that variations and changes may be made therein, without departing from the invention as set forth in the claims.

I claim:

1. A machine for stacking boards in courses comprising a frame, means on the frame for supporting the boards, a carriage mounted to reciprocate in the frame, arms mounted on the carriage, means to pivot the arms to pick up and transport a course of lumber from the support means to a receiving hoist, dogs pivotally mounted on the frame adjacent the receiving hoist, and means for pivoting the dogs sequentially to a rearward upstanding, retracted, forward upstanding and retracted positions, the dogs extending above the frame when pivoted in upstanding positions to engage an edge of the course on the arms, whereby the course is discharged from the arms in staggered relation to the preceding course when the carriage reciprocates in the frame.

2. A machine for stacking boards in courses comprising horizontally shiftable fork members arranged for receiving thereon and for discharging a course of boards onto receiving means, rack means arranged in longitudinal alignment with the fork members for receiving a course of boards and for discharging the course onto the fork members, a conveyor extending to the rack means and discharging onto the rack means, power driven means disposed above said conveyor to transfer boards to said rack means from said conveyor, means for reciprocating the rack means and for raising and lowering the rack means relative to the conveyor, and means for tilting the fork members relative to the rack means.

3. A machine for stacking lumber in courses comprising an endless conveyor extending from a forward end of the machine toward a rearward end thereof and terminating at a point intermediate said forward and rearward ends thereof for conveying a course of boards, rack means extending from the discharge end of said endless conveyor toward the rearward end of the machine for receiving the course of boards, said rack means comprised of a plurality of idler rollers, power means for transferring boards to said rack means, and fork members extending from the discharge end of the rack means.

4. A machine for stacking lumber in courses comprising an endless conveyor extending from a forward end of the machine toward a rearward end thereof and terminating at a point intermediate said forward and rearward ends thereof for conveying a course of boards, rack means extending from the discharge end of said endless conveyor toward the rearward end of the machine for receiving the course of boards, fork members extending from the discharge end of the rack means, power feeding means disposed above said endless conveyor for moving the boards from the endless conveyor to the rack means, a stop at the discharge end of the rack means, and means for stopping the feeding action of the power means in response to the formation of a course of boards on said rack means.

5. A machine for stacking lumber in courses comprising an endless conveyor extending from a forward end of the machine toward a rearward end thereof and terminating at a point intermediate said forwad and rearward ends thereof for conveying a course of boards, rack means extending from the discharge end of said endless conveyor toward the rearward end of the machine for receiving the course of boards, a carriage device mounted for movement lengthwise of the machine, a dog mounted for movement into and out of the path of movement of the boards, means operatively connecting the carriage with the dog to move the dog into and out of stop position, and means for alternately positioning the dog in different positions for the successive actuations by the carriage.

6. A machine for stacking lumber in courses comprising a conveyor extending from a forward end of a machine toward a rearward end thereof, fork members arranged to receive the lumber from the conveyor and to direct the lumber onto a stack, a carriage device, means mounting the carriage device for travel back and forth between the forward and rearward ends of the machine, and means actuated by the carriage device at one end of travel thereof for tilting the fork members to effect stacking of the lumber.

7. A machine for stacking lumber in courses comprising a conveyor extending from a forward end of the machine to a rearward end thereof for conveying a course of boards, fork members mounted at the rearward end of the machine in position for receiving the course of boards from the conveyor, a carriage device mounted for movement lengthwise of the machine, an endless chain operatively connected with the carriage device for effecting movement thereof, and means operatively connected with the endless chain and actuated by the carriage device at one end of the movement thereof for effecting tilting movement of the fork members to effect stacking of the course of boards.

8. A machine for stacking lumber in courses comprising a conveyor extending from a forward end of a machine toward a rearward end thereof for conveying a course of boards, fork members disposed at the rearward end of the machine for receiving the course of boards from the conveyor, a carriage device mounted for movement lengthwise of the machine, means actuated by the movement of the carriage device for effecting tilting movement of the fork members, an elevator disposed beneath the fork members at the rearward end of the machine, and means actuated by the movement of the carriage device for effecting lowering movement of the elevator during the stacking of the boards thereon.

References Cited in the file of this patent

UNITED STATES PATENTS

| | | |
|---|---|---|
| 2,730,247 | Lawson | Jan. 10, 1956 |
| 2,861,702 | Mason | Nov. 25, 1958 |
| 2,918,852 | Buccicone | Dec. 29, 1959 |